United States Patent
Yamamoto et al.

(10) Patent No.: US 8,502,911 B2
(45) Date of Patent: Aug. 6, 2013

(54) IMAGE PICKUP APPARATUS, DISPLAY AND IMAGE PROCESSING APPARATUS

(75) Inventors: Kenji Yamamoto, Kanagawa (JP); Kengo Hayasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/461,171

(22) Filed: Aug. 4, 2009

(65) Prior Publication Data

US 2010/0045844 A1      Feb. 25, 2010

(30) Foreign Application Priority Data

Aug. 21, 2008   (JP) ................................. 2008-212831

(51) Int. Cl.
| | |
|---|---|
| H04N 5/225 | (2006.01) |
| H04N 5/232 | (2006.01) |
| G02B 27/10 | (2006.01) |
| G03B 13/00 | (2006.01) |

(52) U.S. Cl.
USPC ............ 348/343; 348/340; 348/345; 359/626

(58) Field of Classification Search
USPC ...... 348/335, 340, 343, 345, 369; 250/208.1; 359/619, 626
See application file for complete search history.

(56) References Cited

U.S. PATENT DOCUMENTS

| | | | | |
|---|---|---|---|---|
| 7,732,744 | B2 * | 6/2010 | Utagawa ..................... | 250/208.1 |
| 7,956,924 | B2 * | 6/2011 | Georgiev ...................... | 348/340 |
| 2008/0152215 | A1 * | 6/2008 | Horie et al. ................... | 382/154 |
| 2008/0278483 | A1 | 11/2008 | Hong et al. | |
| 2009/0185801 | A1 * | 7/2009 | Georgiev et al. .............. | 396/332 |

FOREIGN PATENT DOCUMENTS

| | | |
|---|---|---|
| WO | WO-2006/039486 | 4/2006 |
| WO | WO-2007/058409 A1 | 5/2007 |
| WO | WO-2007/092545 A2 | 8/2007 |
| WO | WO-2008/039004 A1 | 4/2008 |

OTHER PUBLICATIONS

Ng et al., "Light Field Photography with a Hand-Held Plenoptic Camera," Stanford Tech Report CTSR Feb. 2005, pp. 1-11.
European Search Report issue May 31, 2010 in corresponding European Application No. 09 25 1882.

* cited by examiner

Primary Examiner — Daniel M Pasiewicz
(74) Attorney, Agent, or Firm — Rader, Fishman & Grauer PLLC (57) ABSTRACT

An image pickup apparatus includes: an image pickup lens; an image pickup device to obtain image pickup data; a microlens array on an image forming plane of the image pickup lens; and an image processing section producing an image based on the image pickup data. The microlens array includes microlenses each provided corresponding to pixels of the image pickup device. The image processing section includes a parallax image producing section and a resizing section. The parallax image producing section extracts pixel data from the image pickup data and synthesizes the pixel data to produce a plurality of parallax images. Each of the extracted pixel data corresponds to each of pixels located at the same position in image pickup regions of the image pickup device, each region corresponding to each microlens. The resizing section resizes each parallax image to change the resolutions thereof.

10 Claims, 12 Drawing Sheets

IMAGE PICKUP APPARATUS, DISPLAY AND IMAGE PROCESSING APPARATUS

BACKGROUND OF THE INVENTION

1. Field of the Invention

The present invention relates to an image pickup apparatus, a display and an image processing apparatus which each include a microlens array.

2. Description of the Related Art

Various image pickup apparatuses have been proposed and developed. An image pickup apparatus performing predetermined image processing on image pickup data obtained by picking up an image to output the processed image pickup data has been also proposed.

For example, International Patent Publication No. 06/039486 and Ren. Ng, et al. "Light Field Photography with a Hand-Held Plenoptic Camera", Stanford Tech Report CTSR 2005-02 propose image pickup apparatuses using a technique called "Light Field Photography". The image pickup apparatus includes an image pickup lens, a microlens array, an image pickup device and an image processing section, and image pickup data obtained from the image pickup device includes the intensity distribution of light on a light-sensing plane as well as information on the traveling direction of the light. Thereby, the image processing section reconstructs an image (hereinafter referred to as reconstructed image) viewed from an arbitrary field of view or an arbitrary focal point.

SUMMARY OF THE INVENTION

The above-described microlens array includes a plurality of microlenses, and a plurality of pixels in the image pickup device are allocated to each microlens. Then, the number of pixels in an image reconstructed by the above-described technique is equal to the number of microlenses in the microlens array, because in image pickup data obtained by the above-described technique, an image region (a unit image) for each microlens is formed, and information on the two-dimensional coordinates of the reconstructed image is determined by the coordinates of the microlens array. Therefore, the number of pixels in the reconstructed image is equal to a value determined by dividing the total number of pixels of the image pickup device by the number of pixels allocated to each microlens. On the other hand, the number of pixels allocated to each microlens is equal to the resolution of information on the angle of a light ray, and is the resolution of the reconstructed image from an arbitrary field of view or an arbitrary focal point, so the number of pixels allocated to each microlens has a trade-off relationship with the number of pixels in the two-dimensional coordinates.

Now, resizing (downsizing and upsizing) of image resolution is considered. In the case where a resizing process is performed on image pickup data obtained by the above-described technique, it is difficult to change the number of unit images corresponding to the number of microlenses. Therefore, the resolution of the reconstructed image produced by the image pickup data is not resized. In addition, this case is equivalent to changing the number of pixels in each unit image, that is, the angular resolution of an obtained light ray. Thus, a technique of resizing the resolution of the reconstructed image in the image pickup data obtained so as to include information on the traveling direction of the light ray, that is, a technique of changing the number of unit images each formed for each microlens has not yet established, and the achievement of such a technique is desired.

It is desirable to provide an image pickup apparatus, a display and an image processing apparatus which are capable of changing the number of unit images each formed for each microlens in image pickup data obtained so as to include information on the traveling direction of a light ray.

According to an embodiment of the invention, there is provided an image pickup apparatus including: an image pickup lens; an image pickup device obtaining image pickup data based on light detected; a microlens array including a plurality of microlenses, and arranged on an image forming plane of the image pickup lens, each of the microlenses being provided corresponding to a plurality of pixels of the image pickup device; and an image processing section producing an image based on the image pickup data obtained from the image pickup device. In this case, the image processing section includes a parallax image producing section extracting pixel data from the image pickup data, each of the pixel data corresponding to each of pixels located at the same position in image pickup regions of the image pickup device, each of the image pickup regions corresponding to each of the microlenses, and then synthesizing the pixel data to produce a plurality of parallax images, and a resizing section performing a resizing process on each of the parallax images to change the resolutions thereof.

In the image pickup apparatus according to the embodiment of the invention, an image of an object by the image pickup lens is formed on the microlens array. Then, an incident light ray to the microlens array reaches the image pickup device through the microlens array. Thereby, the image of the object corresponding to each microlens is formed on the image pickup device, and image pickup data including information on the position of the light ray as well as information on the traveling direction of the light ray is obtained. On the basis of the image pickup data, in the image processing section, a number of parallax images equal to the number of microlenses are formed by the parallax image producing section. The resizing section performs a resizing process on each of the parallax images. In other words, the number of pixels in each parallax image is changed.

According to an embodiment of the invention, there is provided a display including: an image processing section producing an image based on image pickup data obtained through an image pickup optical system having an image pickup lens and a microlens array provided between the image pickup lens and an image pickup device and including a plurality of microlenses, each of the microlenses being provided corresponding to a plurality of pixels of the image pickup device; and a display section displaying an image produced by the image processing section. In this case, the image processing section includes a parallax image producing section extracting pixel data from the image pickup data, each of the pixel data corresponding to each of pixels located at the same position in image pickup regions of the image pickup device, each of the image pickup regions corresponding to each of the microlenses, and then synthesizing the pixel data to produce a plurality of parallax images, and a resizing section performing a resizing process on each of the parallax images to change the resolution thereof.

According to an embodiment of the invention, there is provided an image processing apparatus including: an image processing section producing an image based on image pickup data obtained through an image pickup optical system having an image pickup lens and a microlens array provided between the image pickup lens and an image pickup device and including a plurality of microlenses, each of the microlenses being provided corresponding to a plurality of pixels of the image pickup device. In this case, the image processing section includes a parallax image producing section extracting pixel data from the image pickup data, each of the pixel data corresponding to each of pixels located at the same position in image pickup regions of the image pickup device, each of the image pickup regions corresponding to each of the microlenses, and then synthesizing the pixel data to produce a plurality of parallax images, and a resizing section performing a resizing process on each of the parallax images to change the resolutions thereof.

In the display and the image processing apparatus according to the embodiment of the invention, in image processing section, first, the parallax image producing section produces a number of parallax images equal to the number of microlenses for image pickup data obtained through the image pickup optical system having the microlens array. The resizing section performs a resizing process on each of the produced parallax images. In other words, the number of pixels in each parallax image is changed.

In the image pickup apparatus and the image processing apparatus according to the embodiment of the invention, the parallax image producing section produces a plurality of parallax images based on image pickup data obtained by detecting light keeping the traveling directions of light rays, and then the resizing section performs a resizing process on each of the plurality of parallax images, so the number of image pickup regions (unit images) corresponding to the microlenses may be changed in the image pickup data obtained from the image pickup device. Thereby, in the display, an image with an arbitrary resolution may be displayed.

Other and further objects, features and advantages of the invention will appear more fully from the following description.

DETAILED DESCRIPTION OF THE PREFERRED EMBODIMENTS

Preferred embodiments of the invention will be described in detail below referring to the accompanying drawings.

Figure 1:
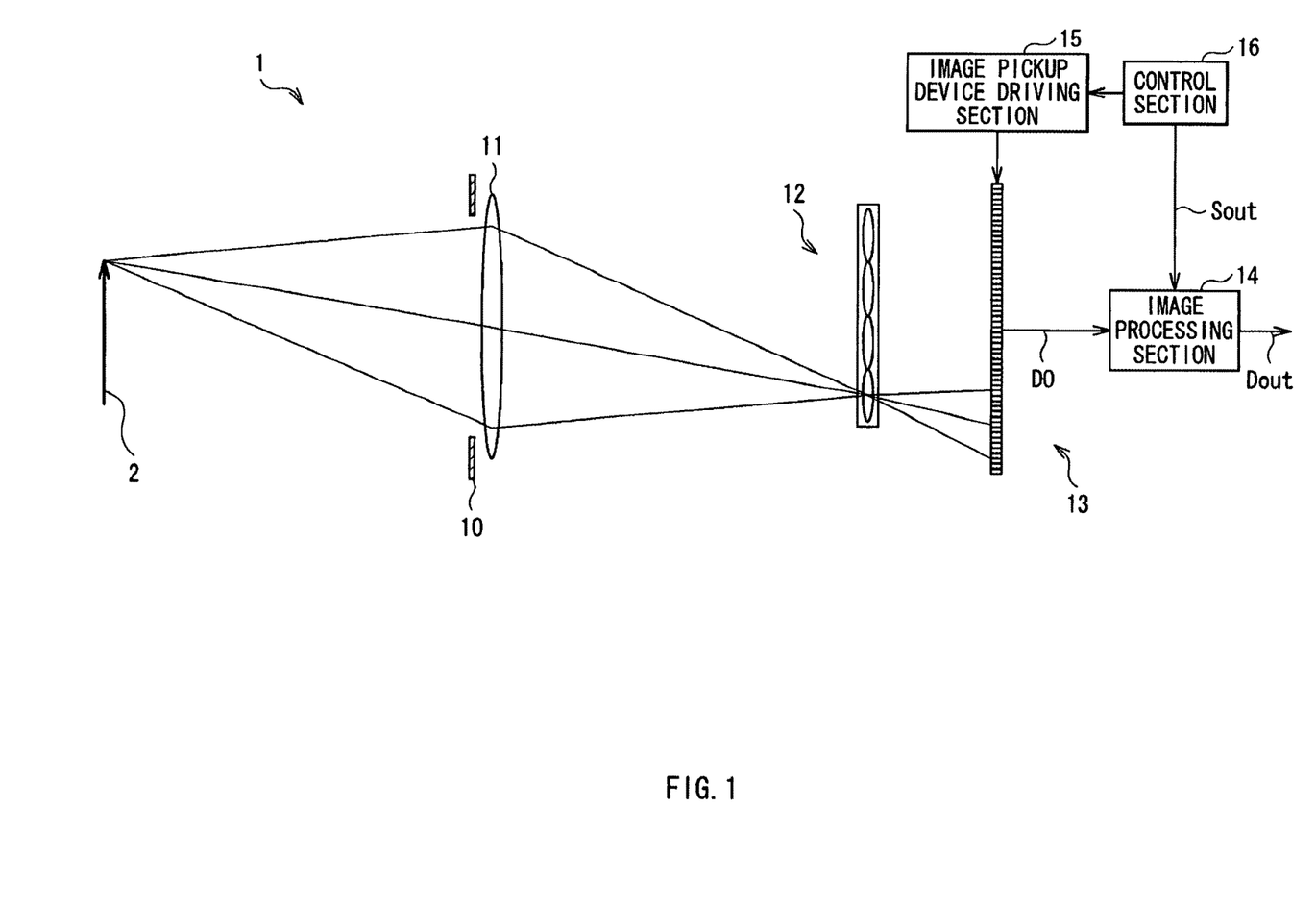
FIG. 1 is an illustration of the whole configuration of an image pickup apparatus according to an embodiment of the invention.

FIG. 1 illustrates the whole configuration of an image pickup apparatus (an image pickup apparatus 1) according to an embodiment of the invention. The image pickup apparatus 1 picks up an image of an object 2, and performs predetermined image processing on the image, thereby to output image data Dout. The image pickup apparatus 1 includes an aperture stop 10, an image pickup lens 11, a microlens array 12, an image pickup device 13, an image processing section 14, an image pickup device driving section 15 and a control section 16.

The aperture stop 10 is an optical aperture stop of the image pickup lens 11.

The image pickup lens 11 is a main lens for picking up an image of an object, and includes, for example, a typical image pickup, lens used in a video camera, a still camera or the like.

In the microlens array 12, a plurality of microlenses which will be described later are arranged, and the microlens array 12 is arranged on an focal plane (an image forming plane) of the image pickup lens 11. Each microlens is made of, for example, a solid lens, a liquid crystal lens, a diffractive lens or the like. A plurality of pixels in the image pickup device 13 are allocated to one microlens in the microlens array 12.

The image pickup device 13 receives or detects a light ray from the microlens array 12 to produce image pickup data D0 including a plurality of pixel data, and is arranged on a focal plane (an image forming plane) of the microlens array 12. The image pickup device 13 includes a plurality of two-dimensional solid-state image pickup devices such as a CCD (Charge Coupled Device) or a CMOS (Complementary Metal-Oxide Semiconductor) arranged in a matrix form.

On a light-sensing plane (a plane closer to the microlens array 12) of such an image pickup device 13, a number M×N (M and N each are an integer) of image pickup pixels are arranged in a matrix form, and a plurality of image pickup pixels are allocated to one microlens in the microlens array 12. The number of image pickup pixels on the light-sensing plane is, for example, M×N=3720×2520=9374400, and 3×3=9 image pickup pixels of the 9373300 image pickup pixels are allocated to one microlens. The resolution of a reconstructed image which will be described later, for example, resolution in an arbitrary field of view, resolution in a depth direction on the basis of refocusing arithmetic processing (resolution in an arbitrary focal point), or the like increases with an increase in values m and n as the number of pixels allocated to each microlens. On the other hand, values (M/m) and (N/n) are related to the resolution of the reconstructed image, so the resolution of the reconstructed image increases with an increase in the values (M/m) and (N/n). As described above, there is a trade-off relationship between the resolution of the reconstructed image and the resolution in an arbitrary field of view or an arbitrary focal point.

The image processing section 14 performs predetermined image processing on image pickup data D0 obtained from the image pickup device 13, and outputs image pickup data Dout obtained by performing the image processing. The image processing section 14 will be described in detail later.

The image pickup device driving section 15 drives the image pickup device 13, and controls the light-sensing operation of the image pickup device 13.

The control section 16 controls the operations of the image processing section 14 and the image pickup device driving section 15, and includes, for example, a microcomputer or the like.

Figure 2:
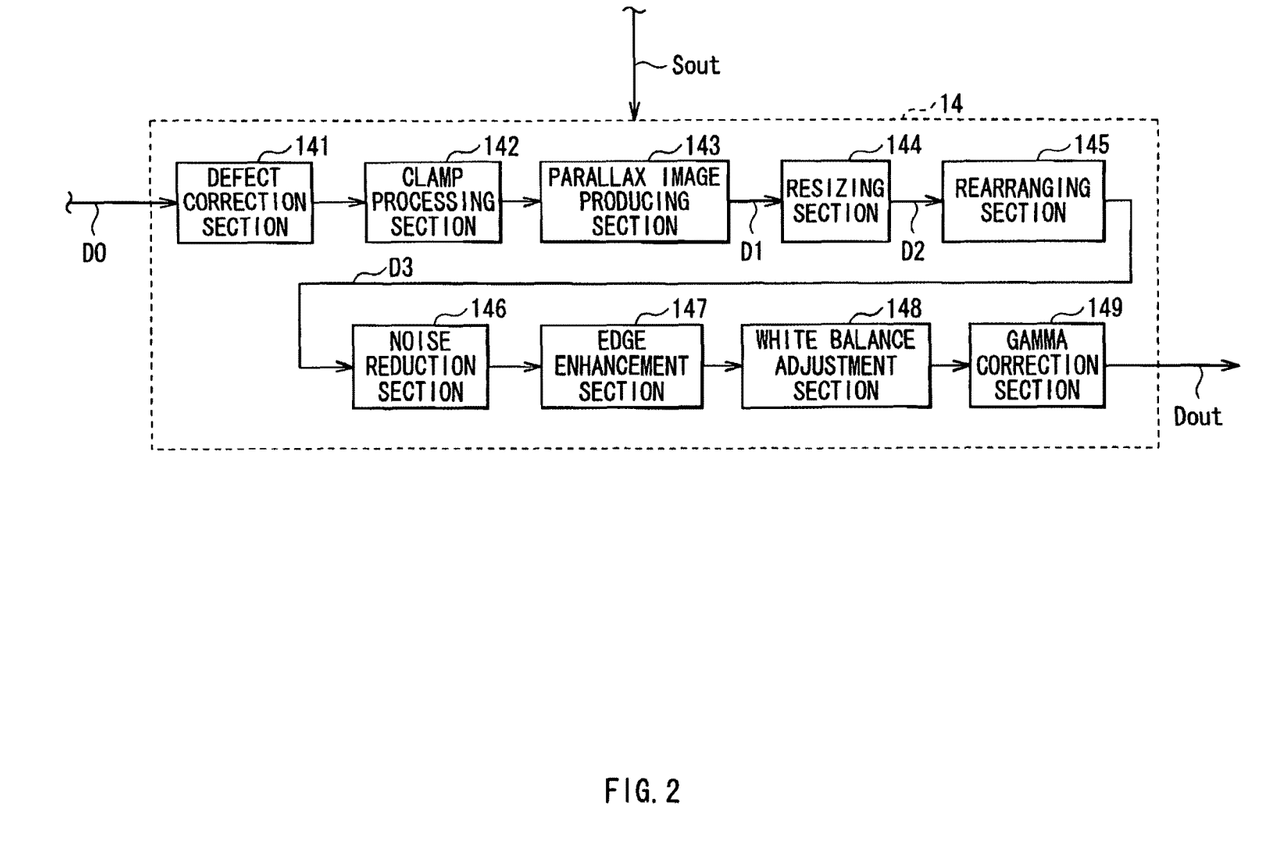
FIG. 2 is a functional block diagram of the whole configuration of an image processing section illustrated in FIG. 1.

Next, the configuration of the image processing section 14 will be described in detail below referring to FIG. 2. FIG. 2 illustrates a functional block diagram of the whole configuration of the image processing section 14.

The image processing section 14 includes, for example, a defect correction section 141, a clamp processing section 142, a parallax image producing section 143, a resizing section 144, a rearranging section 145, a noise reduction section 146, an edge enhancement section 147, a white balance adjustment section 148 and a gamma correction section 149.

The defect correction section 141 corrects a defect such as loss or invalidity included in the image pickup data D0 (a defect caused by an abnormality in the image pickup device 13). The clamp processing section 142 performs a process (clamp processing) of setting the black level of each pixel data on image pickup data obtained by defect correction by the defect correction section 142.

The parallax image producing section 143 produces a number of parallax images equal to the number of microlenses in the microlens array 12 from image pickup data supplied from the clamp processing section 142. A plurality of parallax images produced by the parallax image producing section 143 are supplied to the resizing section 144 as image data D1.

The resizing section 144 performs a resizing process on the image data D1 supplied from the parallax image producing section 143 to produce a plurality of parallax images with a changed resolution (a changed number of pixels). The plurality of parallax images with a resolution changed by the resizing section 144 is supplied to the rearranging section 145 as image data D2. Processing operations of the above-described parallax image producing section 143 and the above-described resizing section 144 will be described in detail later.

The rearranging section 145 performs a rearranging process on pixel data forming the image data D2 supplied from the resizing section 144 so that the pixel data are located at corresponding positions in the pixel arrangement of the original image pickup data D0 again, thereby to obtain image data D3. The image data D3 obtained by the rearranging process is supplied to the noise reduction section 146.

The noise reduction section 146 performs a process of reducing noise (for example, noise generated when an image is picked up in a dark place or a place with insufficient sensitivity) included in the image data supplied from the rearranging section 145. The edge enhancement section 147 performs an edge enhancement process, that is, a process of enhancing the edge of an image on image data supplied from the noise reduction section 146.

The white balance adjustment section 148 performs a process (a white balance adjustment process) of adjusting color balance affected by an individual difference among devices such as a difference in spectral sensitivity of the image pickup device 13, illumination conditions, or the like on image data supplied from the edge enhancement section 147.

The gamma correction section 149 performs predetermined gamma correction (tone or contrast correction) on image data supplied from the white balance adjustment section 148 so as to produce image pickup data Dout.

Figure 3:
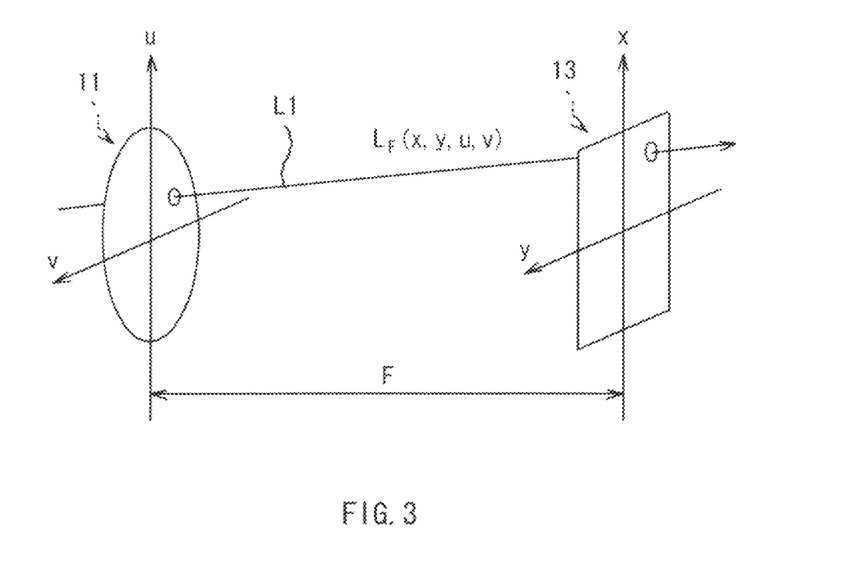
FIG. 3 is a schematic view for describing information on a light ray entering into an image pickup device.
Figure 4:
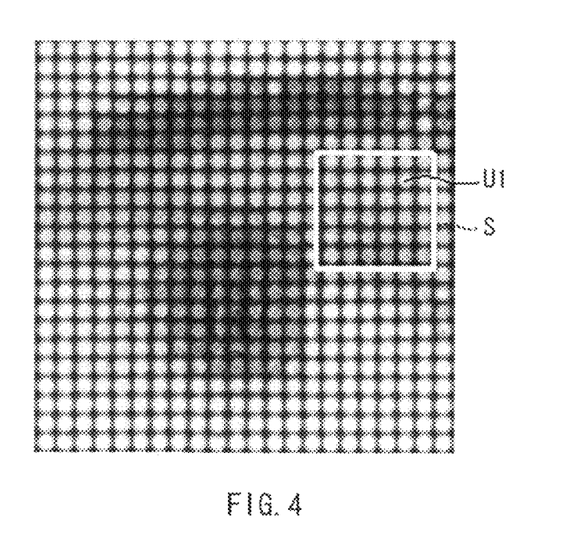
FIG. 4 is a picked-up image corresponding to image pickup data obtained from the image pickup device.
Figure 5A:
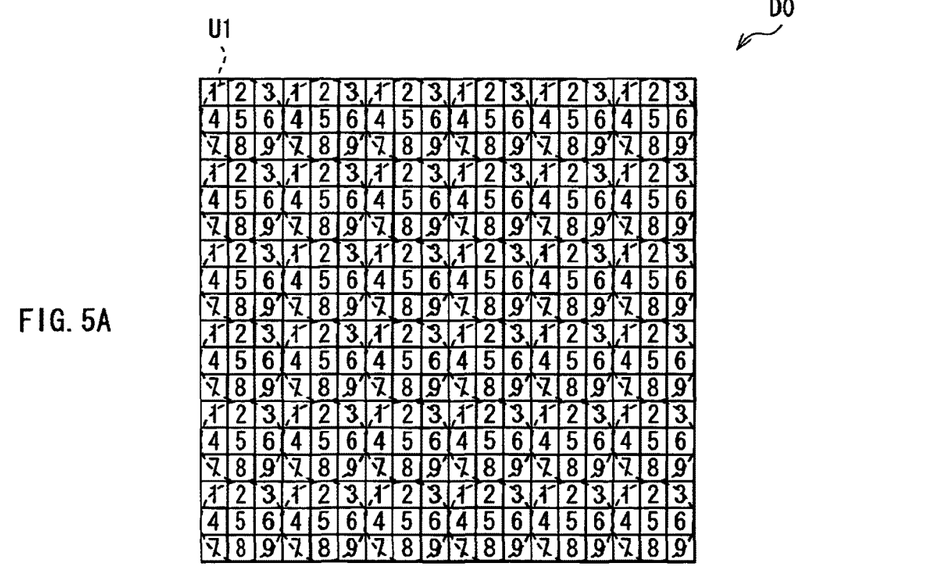
FIGS. 5A and 5B are schematic views for describing parallax image producing operation of a parallax image producing section illustrated in FIG. 2.
Figure 5B:
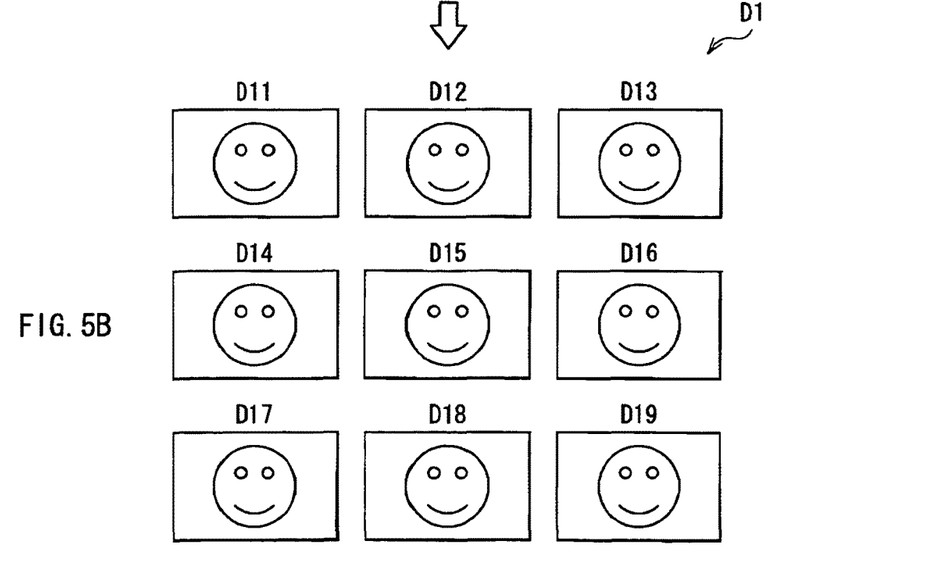
Figure 6A:
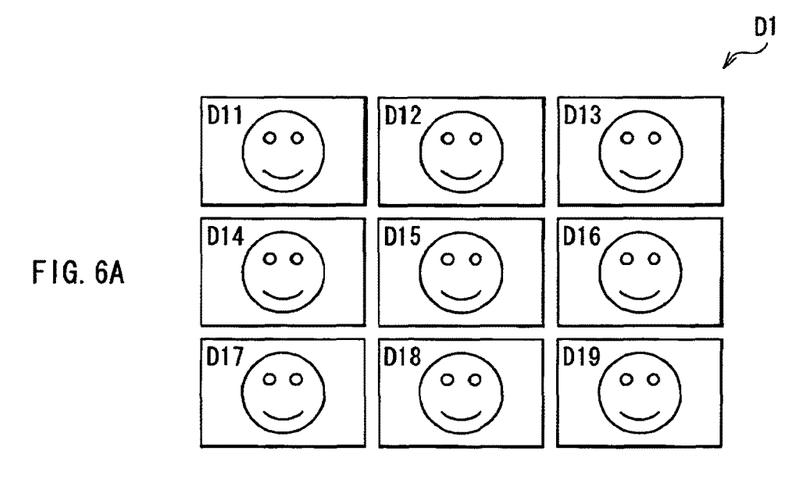
FIGS. 6A and 6B are schematic views for describing resizing operation of a resizing section illustrated in FIG. 2.
Figure 6B:
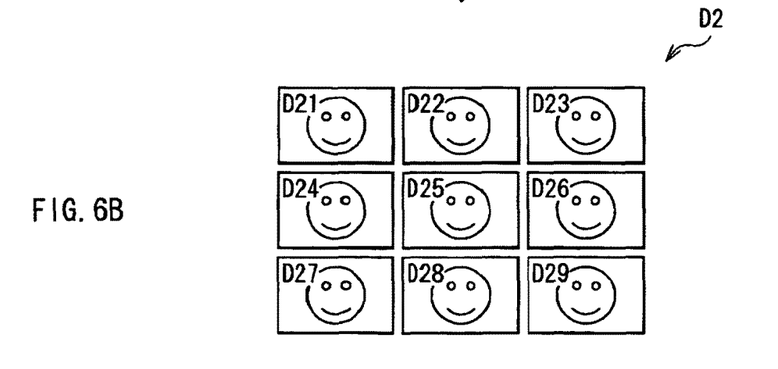
Figure 7A:
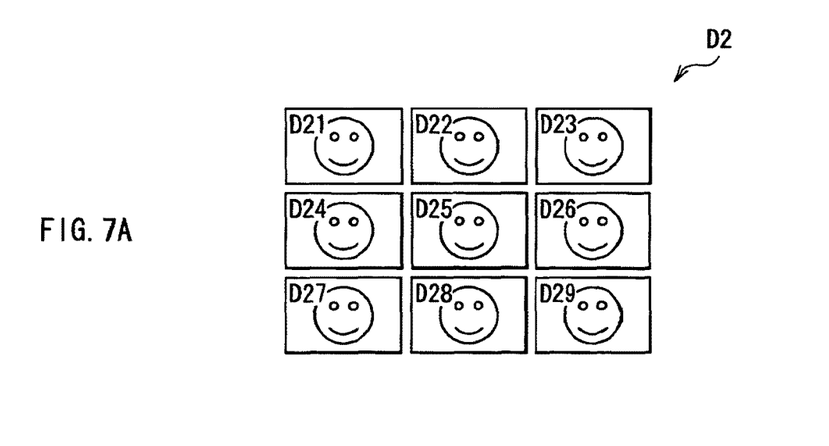
FIGS. 7A and 7B are schematic views for describing rearranging operation of a rearranging section illustrated in FIG. 2.
Figure 7B:
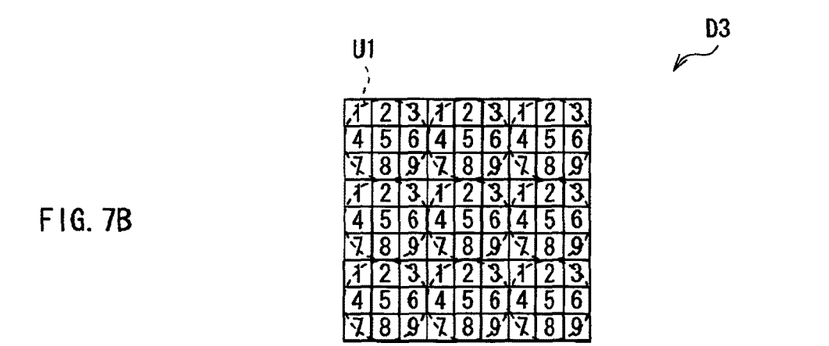

Next, referring to FIGS. 1 to 7A and 7B, functions and effects of the image pickup apparatus 1 according to the present embodiment will be described in detail below. FIG. 3 is a schematic view for describing information on a light ray included in the image pickup data D0. FIG. 4 is an actually picked-up image corresponding to the image pickup data D0. FIGS. 5A and 5B are schematic views for describing parallax image producing operation in the parallax image producing section 143. FIGS. 6A and 6B are schematic views for describing resizing operation in the resizing section 144. FIG. 7A and 7B are schematic views for describing rearranging operation in the rearranging section 145.

In the image pickup apparatus 1, an image of the object 2 by the image pickup lens 11 is formed on the microlens array 12. Then, an incident light ray to the microlens array 12 passes through the microlens array 12 to be detected by the image pickup device 13. At this time, the incident light ray to the microlens array 12 is detected in a position in the image pickup device 13 depending on the incident direction of the incident light ray. Then, the image pickup data D0 is obtained from the image pickup device 13 according to driving operation by the image pickup device driving section 15, and the image pickup data D0 is inputted into the image processing section 14.

Now, a light ray detected by the image pickup device 13 will be described below referring to FIG. 3. As illustrated in FIG. 3, a rectangular coordinate system (u, v) is defined on an image pickup lens plane of the image pickup lens 11, and a rectangular coordinate system (x, y) is defined on an image pickup plane of the image pickup device 13. A distance between the image pickup lens plane of the image pickup lens 11 and the image pickup plane of the image pickup device 13 is defined as "F". Then, a light ray L1 passing through the image pickup lens 11 and the image pickup device 13 as illustrated in the drawing is represented by a four-dimensional function $L_F(x, y, u, v)$. Therefore, information on the traveling direction of the light ray L1 as well as information on the position of the light ray L1 is recorded into the image pickup device 13. In other words, the incident direction of the light ray is determined by the arrangement of the plurality of image pickup pixels allocated to each microlens. Therefore, the image pickup data D0 obtained from the image pickup device 13 includes the intensity of the light ray as well as information on the traveling direction of the light ray.

Moreover, an image of the object 2 for each microlens is formed on the image pickup device 13. As illustrated in FIG. 3, in a picked-up image (a light field image) corresponding to the image pickup data D0, a plurality of unit images U1 are formed corresponding to the two-dimensional arrangement of microlenses in the microlens array 12. In other words, a number of the unit images U1 equal to the number of microlenses are formed. Moreover, each unit image U1 includes a plurality of pixel data, and the pixel data corresponding to pixels located at the same position in the unit images U1 keep information on the same traveling direction of the light ray. For the purpose of simplification, a region S including 6×6 unit images U1 of the image pickup data D0 in the case where 3×3 pixels are allocated to one microlens will be described below.

When the above-described image pickup data D0 is inputted into the image processing section 14, the defect correction section 141 corrects a defect in the image pickup data D0, and the clamp processing section 142 sets an appropriate black level of the image pickup data D0, and then the image pickup data D0 is inputted into the parallax image producing section 143.

The parallax image producing section 143 produces a plurality of parallax images on the basis of the image pickup data D0. More specifically, as illustrated in FIG. 5A, pixel data corresponding to pixels located at the same position (data in regions indicated by the same reference numeral in the drawing) in the unit images U1 are extracted from the image pickup data D0, and the extracted pixel data are synthesized. Thereby, as illustrated in FIG. 5B, 9 parallax images D11 to D19 are produced. The produced parallax images D11 to D19 are images from different viewpoints, and each have a resolution (the number of pixels) of 6×6. Such parallax images D11 to D19 are inputted into the resizing section 144 as the image data D1.

In the resizing section 144, as illustrated in FIG. 6A, 9 parallax images D11 to D19 corresponding to the image data D1 are resized. In the embodiment, a resizing process of reducing the resolution (6×6) of each of the parallax images D11 to D19 (hereinafter referred to as image downsizing process) is performed. The image reduction process is achieved by performing integration processing on, for example, data of an arbitrary number of pixels. Thereby, as illustrated in FIG. 6B, parallax images D21 to D29 with a reduced resolution of, for example, 3×3 are produced. The produced parallax images D21 to D29 are inputted into the rearranging section 145 as the image data D2.

In the rearranging section 145, as illustrated in FIG. 7A, a rearranging process is performed on a plurality of pixel data forming the parallax images D21 to D29 so that the plurality of pixel data are located at corresponding positions in the pixel arrangement of the original image pickup data D0. Thereby, as illustrated in FIG. 7B, image data D3 including 3×3=9 unit images is obtained.

The noise reduction process by the noise reduction section 146, the edge enhancement process by the edge enhancement section 147, the white balance adjustment process by the white balance adjustment section 148 and gamma correction by the gamma correction section 149 are performed on such image data D3 in order, thereby the image data D3 is outputted as the image data Dout from the image processing section 14.

As described above, in the image pickup apparatus 1, in the image processing section 14, the parallax image producing section 143 produces a plurality of parallax images D11 to D19 on the basis of the image pickup data D0, and the resizing section 144 performs the resizing process on the parallax images D11 to D19, thereby the resolution (the number of pixels) of each of the parallax images D11 to D19 is changed. Thereby, the image pickup data D0 and image data including a different number of unit images U1 (image data D2 or D3 or the image data Dout) are obtained. Therefore, a parallax image with an arbitrary resolution is produced, and irrespective of the number of microlenses in the microlens array 12, the number of unit images U1 in the image pickup data D0 is changed to an arbitrary number.

Moreover, when an image reduction process which reduces the resolutions of the parallax images D11 to D19 is performed as the resizing process, a reduction in a recording capacity or a reduction in calculation time is achieved.

In addition, the image pickup apparatus 1 may further include an image storing section (not illustrated), and the image data Dout or the image data D3 obtained by the rearranging process by the rearranging section 145 may be stored in the image storing section.

Next, a modification of the invention will be described below. Like components are denoted by like numerals as of the image pickup apparatus 1 according to the embodiment, and will not be further described.

Modification 1

Figure 8A:
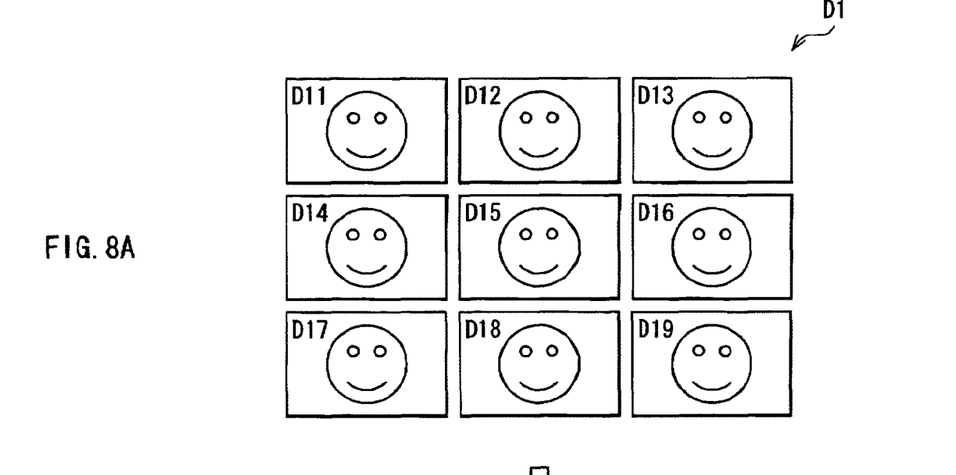
FIGS. 8A and 8B are schematic views for describing another resizing process (Modification 1) of the resizing section illustrated in FIG. 2.
Figure 8B:
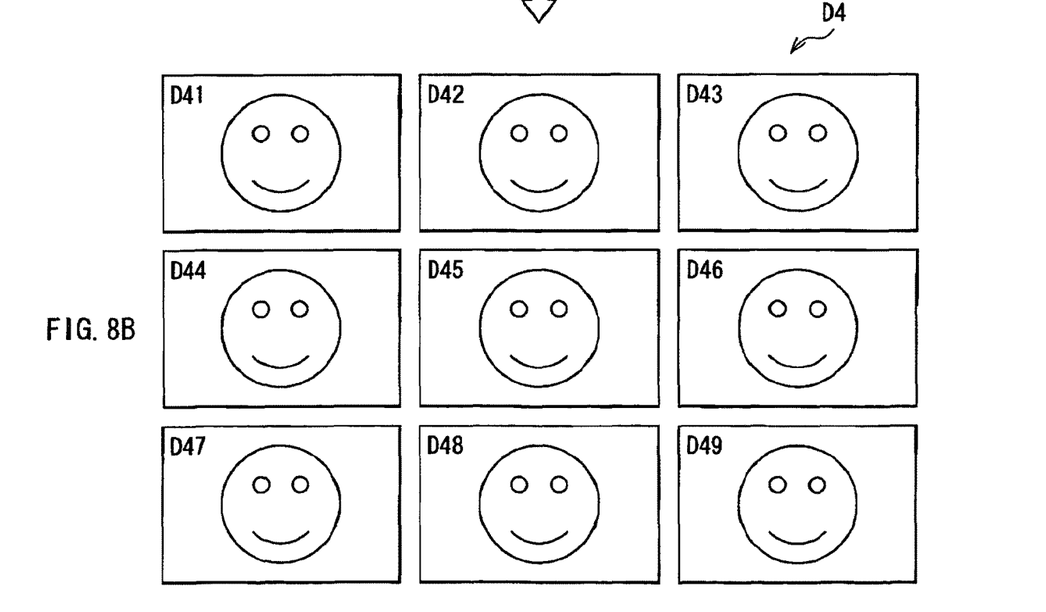
Figure 9:
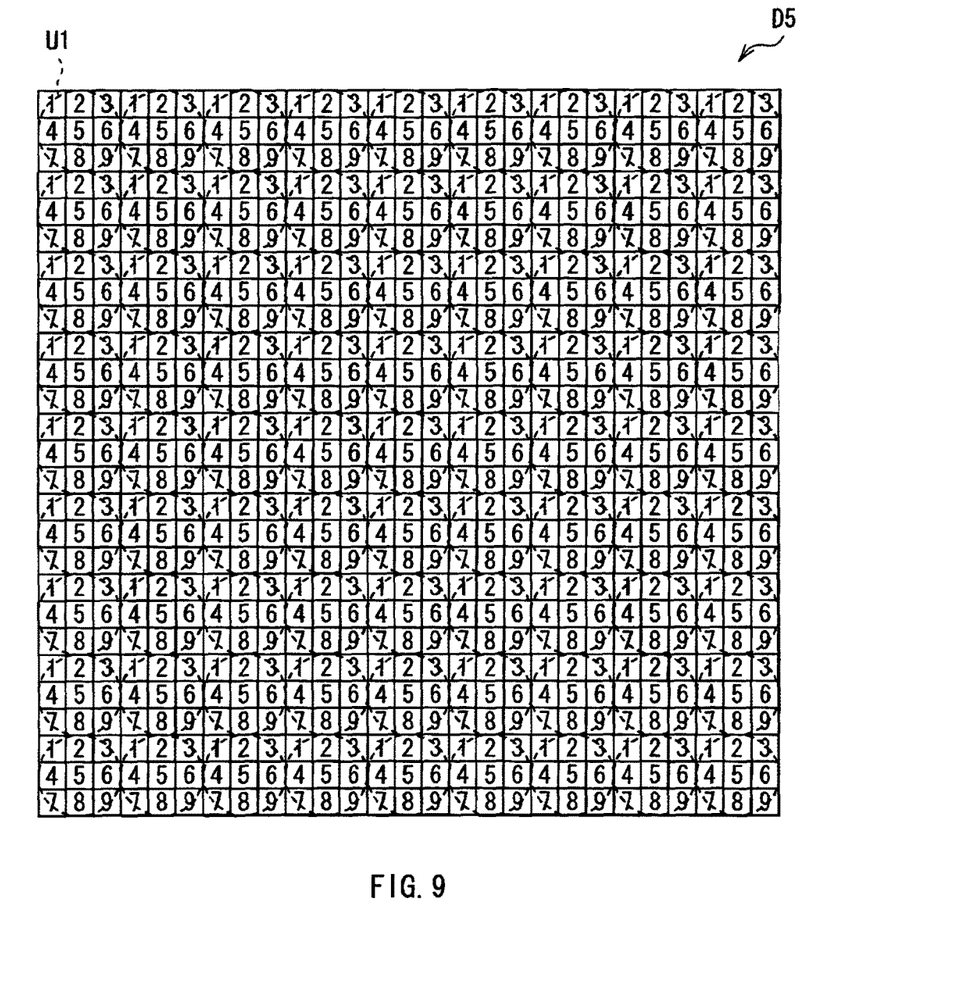
FIG. 9 is a schematic view for describing a pixel data rearrangement following the resizing process in FIG. 8.

FIGS. 8A and 8B are schematic views for describing another resizing operation in the resizing section 144 of the above-described image processing section 14. FIG. 9 is a schematic view of image data D5 obtained by performing, in the rearranging section 145, a rearranging process on image data D4 obtained by the resizing process in FIGS. 8A and 8B.

In this modification, as illustrated in FIG. 8A, the resizing section 144 performs a resizing process in which the resolution (6×6) of each of the parallax images D11 to D19 is increased (hereinafter referred to as an image upsizing process). The image upsizing process is achieved, for example, by performing various pixel interpolation processing such as bicubic interpolation processing. Thereby, as illustrated in FIG. 8B, parallax images D41 to D49 with an increased resolution of, for example, 9×9 are produced. The produced parallax images D41 to D49 are inputted into the rearranging section 145 as image data D4.

In the rearranging section 145, the rearranging process is performed on a plurality of pixel data forming 9 parallax images D41 to D49 corresponding to the image data D4 so that the plurality of pixel data are located at corresponding positions in the pixel arrangement of the original image pickup data D0 (an arrangement corresponding to a light field image). Thereby, as illustrated in FIG. 9, image data D5 in which 9×9=81 unit images U1 are formed is produced. Thus, as the resizing process in the resizing section 144, the image upsizing process in addition to image downsizing process may be performed.

Modification 2

Figure 10:
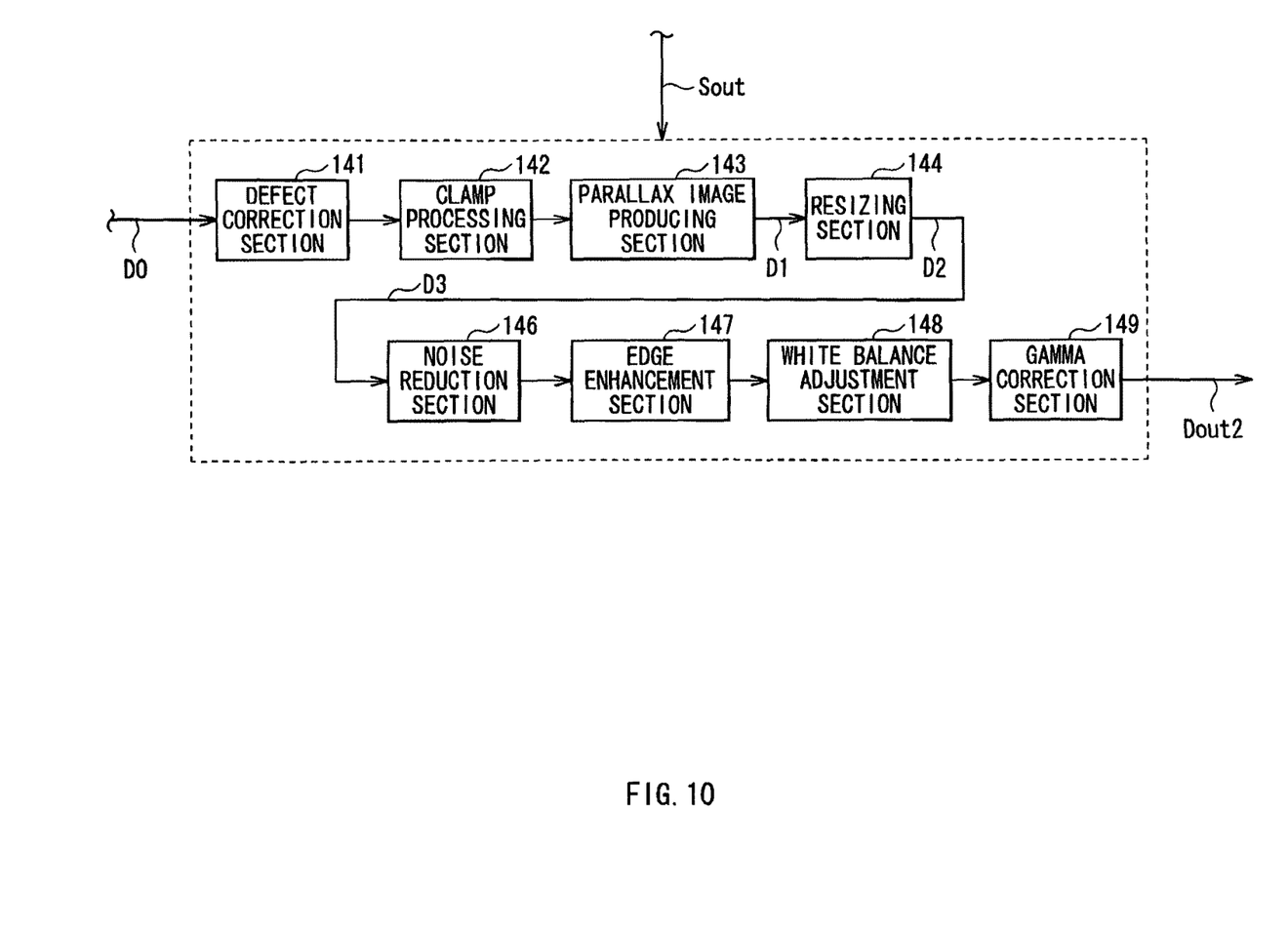
FIG. 10 is a functional block diagram of the whole configuration of an image processing section according to Modification 2.

FIG. 10 is a functional block diagram of the whole configuration of an image processing section 24 according to Modification 2. In the modification, the rearranging section 145 in the image processing section 14 according to the embodiment is not included. More specifically, the parallax image producing section 143 produces parallax images on the basis of the image pickup data D0, and then the resizing section 144 performs a resizing process on the basis of the parallax images. Then, the image data D2 obtained by the resizing process is not supplied to the rearranging section 145, and the noise reduction section 146, the edge enhancement section 147, the white balance adjustment section 148 and the gamma correction section 149 each perform predetermined processing on the image data D2, and the processed image data D2 is outputted as image data Dout2.

Thus, in the image processing section 24, the rearranging section 145 may not be included. In other words, a plurality of parallax images (images from arbitrary viewpoints) obtained by the resizing process may be outputted as image data Dout2.

Figure 11:
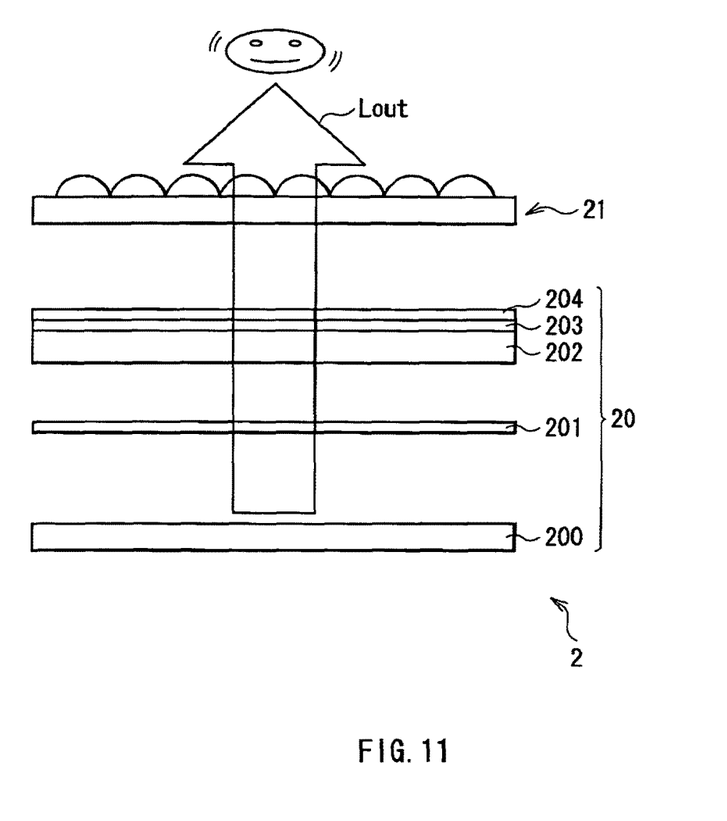
FIG. 11 is a sectional view of the configuration of a main part of a display according to an embodiment of the invention.
Figure 12:
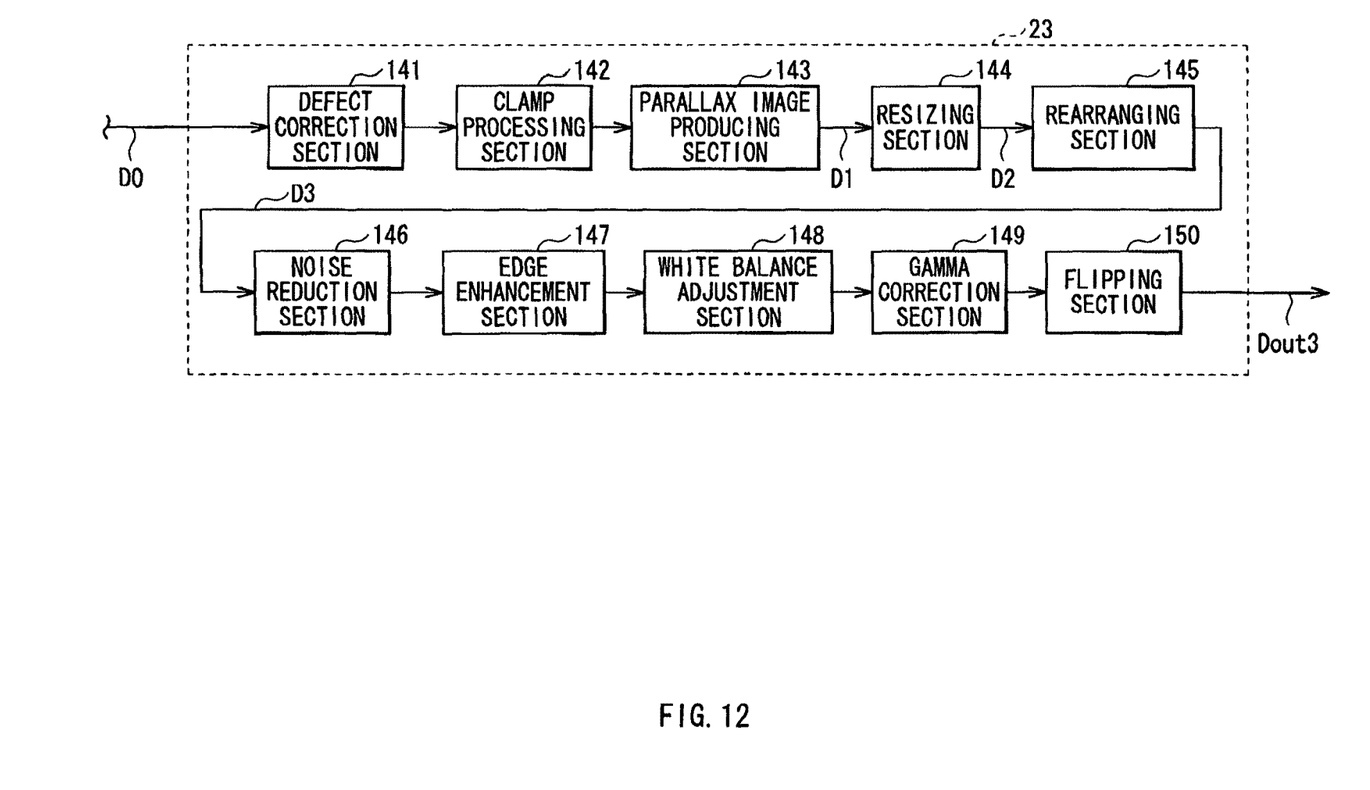
FIG. 12 is a functional block diagram of the whole configuration of an image processing section illustrated in FIG. 11.

FIG. 11 is a sectional view illustrating the configuration of a main part of a display 2 according to an embodiment of the invention. FIG. 12 is a functional block diagram of the whole configuration of an image processing section 23 according to the embodiment. The display 2 includes a display section 20, a microlens array 21 and the image processing section 23 (not illustrated in FIG. 11). The display 2 is a so-called integral photography system 3D display which displays a three-dimensional (3D) image by supplying image data Dout3 from the image processing section 23 to the display section 20. In addition, like components are denoted by like numerals as of the image pickup apparatus 1, and will not be further described.

The display section 20 is a display device for displaying an image such as a graphic form or a character, and is configured of an LCD (a liquid crystal display) in which a plurality of display pixels are arranged in a matrix form. The display section 20 includes a backlight 200, a polarizer 201, a liquid crystal cell 202, a polarizer 203 and a color filter 204. The display section 20 modulates light emitted from the backlight 200 by the liquid crystal cell 202 on the basis of the image data Dout3 to emit display light Lout toward above the microlens array 21.

The liquid crystal cell 202 includes a pair of transparent substrates (not illustrated) and a liquid crystal layer (not illustrated) arranged between the pair of transparent substrates. The liquid crystal cell 202 modulates incident light from the backlight 200 in response to a voltage applied between the transparent substrates on the basis of the image data Dout3.

The polarizer 201 selectively allows light in one polarization direction of light entering into the liquid crystal cell 202 to pass therethrough, and the polarizer 203 selectively allows light in the other polarization direction of light emitted from the liquid crystal cell 202 to pass therethrough. The polarizers 201 and 203 are arranged with the liquid crystal cell 202 in between so that their polarization axes are orthogonal to each other.

The color filter 204 selectively allows light in a wavelength region corresponding to its own emission color (for example, red light, green light or blue light) of light having passed through the liquid crystal cell 202 and the polarizer 203 to pass therethrough.

The microlens array 21 includes a plurality of microlenses arranged, and achieves so-called integral three-dimensional display. Each microlens is made of, for example, a solid lens, a liquid crystal lens, a diffractive lens or the like.

The image processing section 23 performs predetermined image processing on the basis of image pickup data D0 obtained by an image pickup optical system of the image pickup apparatus 1 according to the embodiment, that is, the aperture stop 10, the image pickup lens 11, the microlens array 12 and the image pickup device 13. As illustrated in FIG. 12, the image processing section 23 includes, for example, a defect correction section 141, a clamp processing section 142, a parallax image producing section 143, a resizing section 144, a rearranging section 145, a noise reduction section 146, an edge enhancement section 147, a white balance adjustment section 148, a gamma correction section 149 and a flipping section 150. In other words, in the embodiment, the flipping section 150 performing a flipping process on image data is arranged following the gamma correction section 149 in the image processing section 14 according to the embodiment.

The flipping section 150 performs the flipping process for each unit image U1 on image data D3 obtained by a rearranging process by the rearranging section 145, because as opposed to a picked-up image corresponding to the image pickup data D0 obtained by the above-described image pickup optical system, an actually displayed image corresponding to the image data Dout3 is spatially (i.e., horizontally and vertically) flipped over by the microlens array 21.

In the embodiment, the defect correction section 141 and the clamp processing section 142 perform predetermined processing on the image pickup data D0, and then a parallax image producing process by the parallax image producing section 143, a resizing process by the resizing section 144 and a rearranging process by the rearranging section 145 are performed on the image pickup data D0 in order to obtain the image data D3. Thereby, as in the case of the embodiment, the number of unit images U1 in the image pickup data D0 is arbitrarily changed. Then, predetermined processing in the noise reduction section 146, the edge enhancement section 147, the white balance adjustment section 148 and the gamma correction section 149 is performed on the image data D3, and then the image data D3 is inputted into the flipping section 150. A flipping process is performed on the image data D3 for each unit image U1 in the flipping section 150, and the image data D3 subjected to the flipping process is inputted into the display section 20 as the image data Dout3.

On the other hand, in the display section 20, when a voltage is applied between the transparent substrates of the liquid crystal cell 202 on the basis of the above-described image data Dout3, light emitted from the backlight 200 is modulated to pass through the display section 20, and then the light is emitted toward above the microlens array 21 as display light Lout. At this time, light rays configuring the display light Lout generated on the basis of the image data Dout3 are emitted in different angle directions depending on the positions of pixels in microlenses by the microlens array 21. Then, these light rays enter into the right and left eyes of a viewer as parallax images having different parallaxes. Thereby, for the viewer, the display image looks as if the image is floating above the microlens array 21.

In this case, in the integral 3D display, it is necessary for the number of unit images U1 of the image data Dout3 to be equal to or smaller than the number of microlenses in the microlens array 21. At this point, the number of unit images U1 in the image data Dout3 is arbitrarily set irrespective of the number of microlenses in the microlens array 12 of the image pickup apparatus 1. Therefore, the number of unit images U1 of the image data Dout3 may be changed corresponding to the configuration of the microlens array 21. For example, in the case where the number of microlenses in the microlens array 21 is a×b, the number is fixed, so the number of unit images U1 in the image data Dout3 may be set to a×b at the maximum. At this time, in the case where the number of unit images U1 is a×b, an image is displayed on the whole region of a display screen (the whole region above the microlens array 21). Moreover, in the case where the number of unit image U1 is smaller than a×b, an image is displayed on a partial region of the display screen (a partial region above the microlens array 21).

As described above, in the embodiment, in the parallax image producing section 143, the resizing section 144 and the rearranging section 145 of the image processing section 23, the number of unit images U1 of the image pickup data D is arbitrarily changed depending on the configuration of the microlens array 21, so when integral 3D display is performed, a 3D image with a desired resolution is displayed irrespective of the number of microlenses in the microlens array 12 on an image pickup side and the number of microlenses in the microlens array 21 on a display side.

In addition, the display 2 further includes an image storing section (not illustrated), and the image data Dout3 obtained by the flipping process, the image data D3 obtained by the rearranging process or the image data D2 obtained by the resizing process may be stored in the image storing section.

Modification 3

Figure 13:
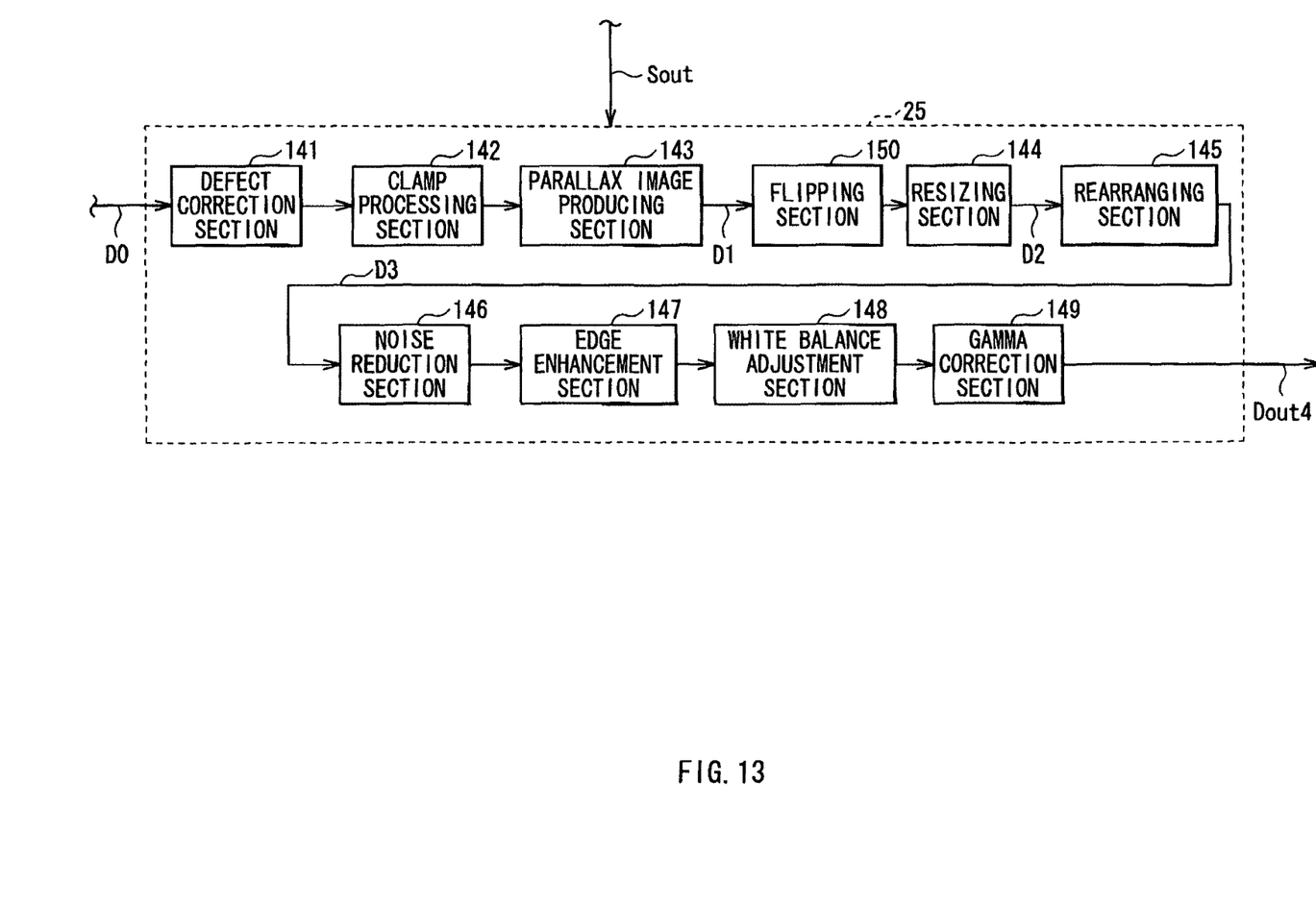
FIG. 13 is a functional block diagram of the whole configuration of an image processing section according to Modification 3.

FIG. 13 is a functional block diagram of the whole configuration of an image processing section 25 according to Modification 3 of the embodiment. The image processing section 25 performs predetermined image processing on the basis of the image pickup data D0 obtained by the image pickup optical system of the image pickup apparatus 1 according to the embodiment. The image processing section 25 has the same configuration as that of the image processing section 23, except that the flipping process by the flipping section 150 is performed between the parallax image producing process by the parallax image producing section 143 and the resizing process by the resizing section 144. In other words, when the image data D1 as a plurality of parallax images is inputted into the flipping section 150, the flipping process is performed on each of the plurality of parallax images to obtain image data D4. The resizing process by the resizing section 144 and the rearranging process by the rearranging section 145 are performed on the image data D4 in order, and then the noise reduction section 146, the edge enhancement section 147, the white balance adjustment section 148 and the gamma correction section 149 perform predetermined processing on the image data D4. Thereby, the image data Dout4 is outputted.

Thus, the flipping process by the flipping section 150 may be performed not only after but also before the rearranging process by the rearranging section 145, more specifically after the parallax image producing process and before the resizing process. Alternatively, the flipping process may be performed after the resizing process and before the rearranging process. In such a case, the same effects as those in the embodiment are obtained.

Although the present invention is described referring to the embodiments, the invention is not limited thereto, and may be variously modified. For example, the configuration in which 3×3=9 pixels are allocated to one microlens is described as an example. However, the invention is not limited thereto, and the number of pixels allocated to one microlens may be determined by a necessary number of pixels in a parallax image, a necessary number of unit images, or design specifications.

Moreover, in the above-described embodiments, the image processing section is described as one of constituent components of the image pickup apparatus 1 or the display 2. However, the image processing section is not necessarily arranged in the image pickup apparatus 1 or the display 2. For example, in the image pickup apparatus 1, the image processing section may be arranged in another apparatus, for example, a PC (a personal computer) or the like, and image pickup data obtained by the image pickup optical system may be transferred to the PC, and image processing may be performed on the image pickup data in the PC. Further, also in the display 2, the image processing section may be arranged in another apparatus as described above, and image data obtained from the image processing section may be transferred to the display section.

The present application contains subject matter related to that disclosed in Japanese Priority Patent Application JP 2008-212831 filed in the Japan Patent Office on Aug. 21, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
an image pickup lens;
an image pickup device obtaining image pickup data based on light detected;
a microlens array including a plurality of microlenses, and arranged on an image forming plane of the image pickup lens; and
an image processing section producing an image based on the image pickup data obtained from the image pickup device,
wherein,
each of the microlenses corresponds to one of a plurality of image pickup regions of the image pickup device, each image pickup region corresponding to a plurality of pixels of the image pickup device,
each image pickup region includes a plurality of positions such that positions in an image pickup region respectively correspond to positions in the other image pickup regions;
each pixel of the plurality of pixels corresponding to an image pickup region is located at one of the plurality of positions, and
the image processing section includes
a parallax image producing section that extracts pixel data from the image pickup data, and then synthesizes the pixel data to produce a plurality of parallax images, each parallax image being produced from pixel data corresponding to a given position, including pixel data corresponding to all of the pixels that are located at a same position as the given position and excluding pixel data corresponding to pixels located at other positions, and
a resizing section that performs a resizing process on each of the parallax images to change the resolutions thereof.

2. The image pickup apparatus according to claim 1, wherein
the image processing section includes a rearranging section configured to perform a pixel data rearrangement process on pixel data forming each of the plurality of parallax images subjected to the resizing process by the resizing section so that the pixel data are located at corresponding positions in a resulting pixel data arrangement after the resizing process.

3. The image pickup apparatus according to claim 1, further comprising an image storing section storing image data of the parallax images subjected to the resizing process.

4. A display comprising:
an image processing section configured to produce an image based on image pickup data obtained through an image pickup optical system having an image pickup lens and a microlens array provided between the image pickup lens and an image pickup device, the microlens array being arranged on an image forming plane of the image pickup lens and including a plurality of microlenses, each of the microlenses being provided corresponding to one of a plurality of image pickup regions of the image pickup device, each image pickup region corresponding to a plurality of pixels of the image pickup device, each image pickup region including a plurality of positions such that positions in an image pickup region respectively correspond to positions in the other image pickup regions, each pixel of the plurality of pixels corresponding to an image pickup region being located at one of the plurality of positions; and
a display section configured to display an image produced by the image processing section,
wherein the image processing section includes
a parallax image producing section that extracts pixel data from the image pickup data, and then synthesizes the pixel data to produce a plurality of parallax images, each parallax image being produced from pixel data corresponding to a given position, including pixel data corresponding to all of the pixels that are located at a same position as the given position and excluding pixel data corresponding to pixels located at other positions, and
a resizing section that performs a resizing process on each of the parallax images to change the resolution thereof.

5. The display according to claim 4, further comprising a second microlens array on a light emission plane of the display section.

6. The display according to claim 5, wherein
the image processing section includes
a rearranging section configured to perform a pixel data rearrangement process on pixel data forming each of the plurality of parallax images subjected to the resizing process by the resizing section so that the pixel data are located at corresponding positions in a resultant pixel data arrangement after the resizing process, and
a flipping section configured to perform a spatial flipping process on the image data subjected to the pixel data rearrangement process.

7. The display according to claim 4, wherein
the parallax image producing section synthesizes the extracted pixel data into the plurality of parallax images, and then performs a spatial flipping process on each of the plurality of parallax images,
the resizing section performs the resizing process on each of the parallax images subjected to
the spatial flipping process, and the image processing section further includes a rearranging section configured to perform a pixel data rearrangement process on pixel data forming each of the plurality of parallax images subjected to the resizing process by the resizing section so that the pixel data are located at corresponding positions in a resultant pixel data arrangement after the resizing process.

8. The display according to claim 5, wherein
the resizing section performs a resizing process on the plurality of parallax images so that the number of pixels in each of the parallax images is equal to the number of microlenses in the second microlens array.

9. An image processing apparatus comprising:
an image processing section configured to produce an image based on image pickup data obtained through an image pickup optical system having an image pickup lens and a microlens array provided between the image pickup lens and an image pickup device, the microlens array being arranged on an image forming plane of the image pickup lens and including a plurality of microlenses, each of the microlenses being provided corresponding to one of a plurality of image pickup regions of the image pickup device, each image pickup region corresponding to a plurality of pixels of the image pickup device, each image pickup region including a plurality of positions such that positions in an image pickup region respectively correspond to positions in the other image pickup regions, each pixel of the plurality of pixels corresponding to an image pickup region being located at one of the plurality of positions,
wherein the image processing section includes
a parallax image producing section that extracts pixel data from the image pickup data, and then synthesizes the pixel data to produce a plurality of parallax images, each parallax image being produced from pixel data corresponding to a given position, including pixel data corresponding to all of the pixels that are located at a same position as the given position and excluding pixel data corresponding to pixels located at other positions, and
a resizing section that performs a resizing process on each of the parallax images to change the resolution thereof.

10. An image pickup apparatus comprising:
an image pickup lens;
an image pickup device obtaining image pickup data $D_0$ based on light detected;
a microlens array including M microlenses, where M is an integer >1, arranged on an image forming plane of the image pickup lens; and
an image processing section producing an image based on the image pickup data $D_0$ obtained from the image pickup device,
wherein,
each of the microlenses corresponds to one of M image pickup regions $U_i$ (i=1, ..., M) of the image pickup device, and each image pickup region $U_i$ corresponds to N pixels of the image pickup device, where N is an integer >1,
each image pickup region $U_i$ includes N positions $P_j$ (j = 1, ..., N), with each pixel corresponding to an image pickup region $U_i$ being located at one of the positions $P_j$, and
the image processing section includes:
a parallax image producing section that extracts pixel data $D_1$ from the image pickup data $D_0$, and then synthesizes the pixel data $D_1$ to produce a plurality of parallax images $I_j$, wherein each parallax image $I_{j=x}$ ... is produced from pixel data $D_1$ from each pixel corresponding to a same position $P_{j=x}$ and excludes pixel data $D_1$ from pixels corresponding to other positions $P_{j \neq x}$,
a resizing section that performs a resizing process on each of the parallax images $I_j$ to change the resolutions thereof, thereby generating pixel data $D_2$ comprising pixel data $D_{j,k}$ and resized parallax images $I'_j$ formed from the pixel data $D_{j,k}$, wherein each resized parallax image $I'_{j=x}$ contains Z pixel data $D_{j=x,k}$ (k=1, ..., Z), where Z is an integer >0 determined by a resizing ratio, and the pixel data $D_{j,k}$ comprises at least one of the pixel data $D_1$ and data interpolated from the pixel data $D_j$, and
a rearranging section that performs a pixel data rearrangement on the pixel data $D_2$ such that an image having Z regions $U'_k$ is formed, wherein each region $U'_k$ includes N positions $P'_j$ and each of the pixel data $D_{j,k}$ is located in a corresponding positions $P'_j$ of a corresponding region $U'_k$.

* * * * *